United States Patent
Ma

(10) Patent No.: US 12,452,556 B1
(45) Date of Patent: Oct. 21, 2025

(54) PIXEL WITH ANTI-BLOOMING CIRCUITRY FORMED IN SHALLOW TRENCH ISOLATION

(71) Applicant: Gigajot Technology, Inc., Glendale, CA (US)

(72) Inventor: Jiaju Ma, Monrovia, CA (US)

(73) Assignee: Gigajot Technology, Inc., Glendale, CA (US)

( * ) Notice: Subject to any disclaimer, the term of this patent is extended or adjusted under 35 U.S.C. 154(b) by 210 days.

(21) Appl. No.: 18/324,874

(22) Filed: May 26, 2023

Related U.S. Application Data

(60) Provisional application No. 63/346,702, filed on May 27, 2022.

(51) Int. Cl.
*H04N 25/77* (2023.01)
(52) U.S. Cl.
CPC .................................. *H04N 25/77* (2023.01)
(58) Field of Classification Search
CPC ..... H04N 25/77; H10F 39/014; H10F 39/802; H10F 39/194; H10F 39/1865; H01L 23/485
See application file for complete search history.

(56) References Cited

U.S. PATENT DOCUMENTS

| 7,663,165 B2 * | 2/2010 | Mouli | H10F 39/026 |
| | | | 257/223 |
| 2006/0011919 A1 * | 1/2006 | Mouli | H10F 39/80373 |
| | | | 257/69 |

OTHER PUBLICATIONS

Sergey Velichko, et al., "Low Noise High Efficiency 3.75 μm and 2.8 μm Global Shutter CMOS Pixel Arrays", In Proceedings of the 2013 International Image Sensor Workshop, Snowbird Resort, UT, USA, pp. 12-16. 2013.
Alex Kyrmski, "Global Shutter Pixel with Floating Storage Gate", In Proceedings In. Image Sensor Workshop, Jun. 2013, pp. 5-8.
V. Lalucaa, et al., "Single Event Effects in 4T and 5T Pinned Photodiode Image Sensors", Retrieved from https://oatao.univ-toulouse.fr/11424/1/Lalucaa_11424.pdf, 2013 pp. 1-28.
Vincent Goiffon, "Radiation Effects on CMOS Active Pixel Image Sensors", Retrieved from https://www.researchgate.net/publication/291787868, Jan. 21, 2019, pp. 1-35.

* cited by examiner

*Primary Examiner* — Ahmed A Berhan
(74) *Attorney, Agent, or Firm* — Robert C. Kowert; Kowert, Hood, Munyon, Rankin & Goetzel, P.C.

(57) ABSTRACT

A pixel of an image sensor may include an anti-blooming (AB) transistor with a gate formed in a shallow trench isolation (STI) of the pixel. The STI is positioned within the horizontal boundaries of the pixel structure. In certain instances, the STI isolates the drain region for a reset transistor of the pixel from a photodiode of the pixel and the AB transistor shares the drain region with the reset transistor. In such instances, the AB transistor may be turned on and provided a higher potential than the photodiode through its gate voltage to drain excess photoelectrons from the photodiode and prevent blooming due to oversaturation of the photodiode. In some instances, the gate of the AB transistor is formed in a separate STI and has its own drain formed next to the gate in the STI with the higher potential being provided through the gate or drain voltage.

20 Claims, 12 Drawing Sheets

PIXEL WITH ANTI-BLOOMING CIRCUITRY FORMED IN SHALLOW TRENCH ISOLATION

This application claims benefit of priority of U.S. Provisional Application Ser. No. 63/346,702, entitled "Poly Filled Shallow Trench for Anti-Blooming Circuitry in Pixels", filed May 27, 2022, which is hereby incorporated in reference herein in its entirety.

BACKGROUND

Technical Field

This disclosure relates generally to an image sensor and more specifically to designs of pixels for capturing light on an image sensor with anti-blooming capabilities.

Description of the Related Art

Image capturing devices, such as cameras, are widely used in various electronic devices, such as mobile devices (e.g., smart phones, tablets, laptops, etc.), robotic equipment, or security monitoring devices, among others. An image capturing device may include an image sensor having a plurality of light-gathering pixels. A pixel may include a photodiode. The image capturing device may capture light from an environment and pass the light to the image sensor. When exposed to light, the photodiodes of the pixels may accumulate photoelectrons. Digital images may produced from an array of pixels by reading out analog signals (e.g., voltage signals) from the pixels and converting the analog signals to digital signals that are then processed by image signal processors to generate a digital image. Blooming in the pixel array is a concern with many pixels in the pixel array being in close proximity to each other. Blooming is caused when the photocurrent generated by incident light on a specific pixel goes go into neighboring pixels after the specific pixel's photodiode is saturated with photoelectrons.

Figure 1:
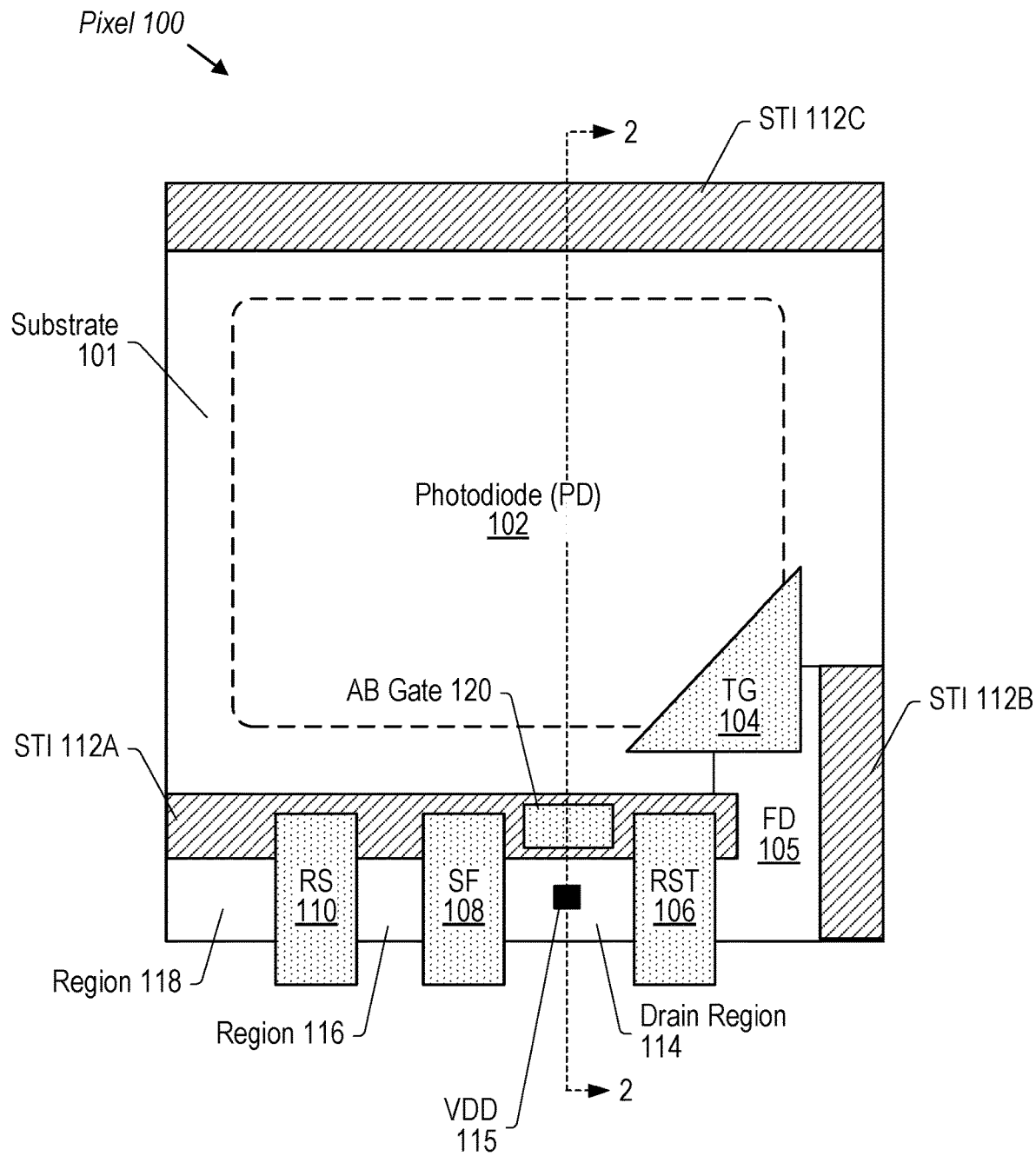
FIG. 1 is a top plan view of an example pixel of an image sensor, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Various embodiments described herein relate to CMOS (complementary metal-oxide semiconductor) image sensors. In certain embodiments, the CMOS image sensors include pixels with anti-blooming (AB) transistors added to the pixels. Blooming is the concept in arrays of pixels where when a photosensitive element (e.g., photodiode) of a pixel becomes saturated with photoelectrons, any additional photoelectrons generated may leak into adjacent/neighboring pixels. This leakage of photoelectrons may cause bright spots or other image defects in digital images generated from the pixel array.

Anti-blooming (AB) is a performance concept related to image sensor pixels that provides a capability for a pixel to avoid blooming of the photocurrent (e.g., photoelectrons) after saturation of the photodiode. In some previously contemplated embodiments, AB functionality in a pixel has been achieved by designing the pixel with a specific doping profile that steers additional photocurrent (e.g., additional photoelectrons) to the floating diffusion (FD) node of the pixel through either the transfer gate (TG) interface or a buried channel. Providing the specific doping profile, however, increase the complexity of the pixel design and has issues with non-uniformity among different pixels in the pixel array due to the difficulty in generating consistent doping profiles between pixels.

Another contemplated solution for AB functionality has been to provide a dedicated AB gate and drain where the AB gate is coupled to the photodiode similarly to how the transfer gate is coupled to the photodiode. For instance, the AB gate may be coupled to the photodiode on an opposite side of the photodiode from where the transfer gate is coupled to the photodiode. The AB gate may be biased with a fixed reference voltage that allows a certain amount of photocurrent to pass through the gate. The AB drain may be biased at another fixed reference voltage. The implementation of the dedicated AB gate and drain provides better AB performance but suffers from additional area being added to the pixel to position the AB gate and drain for coupling to the photodiode. Thus, such an implementation is generally not desirable for pixels with small area sizes (such as less than 2 µm pitch).

To address these current challenges with implementing AB functionality in a pixel design, the present disclosure contemplates embodiments that place an AB gate of an AB transistor inside shallow isolation trench (STI) in the substrate of the pixel. The gate may be formed by replacing a portion of the silicon oxide (or other dielectric) of the STI with polysilicon. The drain for the AB transistor may be a shared drain with other transistors (e.g., a reset transistor) or a dedicated drain placed inside the same STI as the AB gate. In embodiments with a shared drain, the STI may already be in place for the design of the pixel. For instance, the STI may be previously implemented in the pixel design to provide isolation for one or more transistors (e.g., the reset transistor, a source follower (SF) transistor, or a row selection (RS) transistor). In embodiments with a dedicated AB drain, the STI may be an additional STI placed in the substrate of the pixel and inside the perimeter boundaries (e.g., horizontal perimeter) of the pixel structure (e.g., the boundaries of the pixel cell). The dedicated AB drain may be formed by replacing a portion of the silicon oxide of the STI with doped silicon (e.g., n-type doped silicon). A small thickness of silicon oxide may be left in place to isolate the AB drain from the AB gate in the STI.

By placing the AB gate in an STI in the substrate of the pixel, the AB transistor is implemented with little to no area penalty for the pixel design. Placing the AB gate in the STI that is in proximity to the photodiode (e.g., a small silicon substrate well exists between the AB gate/STI and the photodiode) provides a path for photoelectrons (e.g., photocurrent) to be transferred out of the photodiode to avoid oversaturation of the photodiode and blooming. For example, the AB gate may be biased through the gate itself or through a reference voltage coupled to the AB drain to provide the AB transistor with a potential that is higher than photodiode so that photoelectrons transfer through the STI and to the drain of the AB transistor. The photoelectron path through the AB transistor may be selectively turned on/off by changing the potential of the AB transistor (e.g., by changing voltages biased to the AB gate or drain). Various timing schemes for biasing the AB gate/drain during operation of the pixel in association with other pixel transistors (e.g., reset gate, transfer gate, or row selection gate) are described herein. Changes in the biasing of the AB gate/drain may be implemented at various times during operation of the pixel to optimize the AB performance and readout performance of the pixel.

FIG. 1 is a top plan view of an example pixel of an image sensor, according to some embodiments. In various embodiments, pixel 100 is implemented using one or more integrated circuits on a semiconductor substrate (e.g., substrate 101). In certain embodiments, substrate 101 is a silicon substrate. In some embodiments, pixel 100 is part of an image sensor on an image capturing device. For example, pixel 100 may be a pixel in a pixel array of an image sensor. The image sensor may be part of devices including, but not limited to, cameras, mobile devices (e.g., smart phones, tablets, laptops, etc.), robotic equipment, or security monitoring devices.

In the illustrated embodiment, pixel 100 includes photodiode (PD) 102, transfer gate (TG) 104, floating diffusion (FD) region 105 (e.g., FD node), reset (RST) gate 106, source follower (SF) gate 108, and row selection (RS) gate 110. In various embodiments, substrate 101 is a p-type substrate and photodiode 102 is an n-type photodiode. In certain embodiments, photodiode 102 and FD region 105 are formed in substrate 101 while TG gate 104, RST gate 106, SF gate 108, and RS gate 110 are formed above (e.g., vertically above) substrate 101. In various embodiments, pixel 100 includes one or more shallow trench isolations (STIs). For instance, in the illustrated embodiment, pixel 100 includes STI 112A, STI 112B, and STI 112C. In certain embodiments, STIs 112 are formed by silicon oxide though other dielectric materials may be contemplated.

As shown in FIG. 1, TG 104 is positioned above and straddles the space between photodiode 102 and FD region 105. Accordingly, photodiode 102 is the source region for TG 104 and FD region 105 is the drain region for TG 104. RST gate 106 is positioned between FD region 105 and drain region 114 with FD region 105 being the source region and drain region 114 being the drain region for RST gate 106. In various embodiments, RST gate 106 shares drain region 114 with SF gate 108. Region 116 may be shared as the source region of SF gate 108 and the source of RS gate 110 while region 118 is a drain region for RS gate 110. In some embodiments, the output of pixel 100 (not shown) may be connected to region 118.

In certain embodiments, drain region 114 is an n-type drain region and VDD 115 is connected to the drain region. Accordingly, RST gate 106 and SF gate 108 may be provided with VDD as a reference voltage. In various embodiments, STI 112A provides isolation between photodiode 102 and the transistors of RST gate 106, SF gate 108, and RS gate 110. The embodiment of pixel 100 with photodiode 102, TG 104, FD region 105, RST 106, SF gate 108, and RS gate 110 shown in FIG. 1 may be referred to as a 4T (e.g., 4 transistor) pixel architecture with the four transistors including TG 104, RST gate 106, SF gate 108, and RS gate 110. It should be understood that the layout of these four transistors in FIG. 1 is exemplary and that various additional layouts may be contemplated without departing from the intended scope of the present disclosure.

Figure 2:
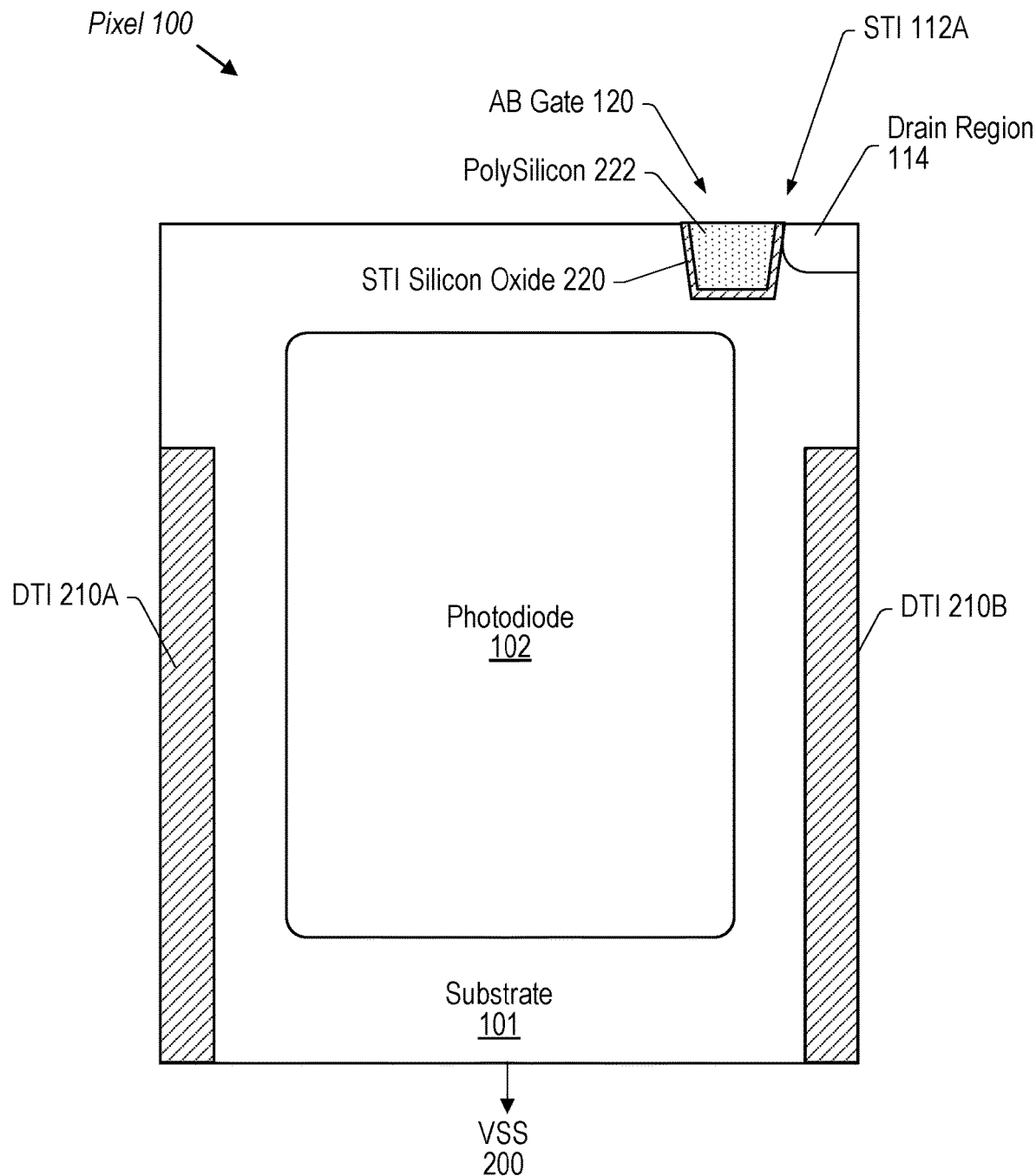
FIG. 2 depicts a cross-sectional view representation of a pixel along the line 2-2 shown in FIG. 1, according to some embodiments.

In certain embodiments, AB (anti-blooming) gate 120 is formed in STI 112A. FIG. 2 depicts a cross-sectional view representation of pixel 100 along the line 2-2 shown in FIG. 1, according to some embodiments. As shown in FIG. 1, line 2-2 is a cross-sectional line through AB gate 120. AB gate 120 may be formed, as shown in FIGS. 1 and 2, within the horizontal boundaries of STI 112A. In various embodiments, AB gate 120 is formed by replacing a portion of the STI dielectric (e.g., STI silicon oxide 220) inside STI 112A with polysilicon 222. For example, STI silicon oxide 220 may be removed from the portion of the STI 112A (also shown in FIG. 1) intended for AB gate 120 to form a well (e.g., trench) that is then filled with polysilicon 222. When the well for AB gate 120 is formed, at least some STI silicon oxide 220 is left along the sidewalls of the well. Thus, when polysilicon 222 is filled into the well to form AB gate 120, the AB gate is isolated from other regions (e.g., drain region 114) by at least some of the STI silicon oxide 220, as shown in FIG. 2. In the depicted embodiment, AB gate 120 has a simple metal-oxide-semiconductor (MOS) gate structure for an n-type field effect transistor (e.g., n-type drain region separated from polysilicon gate by silicon oxide).

In some embodiments, as shown in FIG. 2, photodiode 102 is buried in substrate 101 between deep trench isolation (DTI) 210A and DTI 210B. Substrate 101 may be connected to ground (e.g., Vss 200). In some embodiments, a portion of AB gate 120 is vertically above photodiode 102 with a portion of substrate 101 being positioned between AB gate 120 and photodiode 102. Other embodiments may be contemplated where no portion of AB gate 120 is above photodiode 102. The portion of substrate 101 positioned between AB gate 120 and photodiode 102 may be, for example, a p-type well in the substrate.

In the embodiment of pixel 100 illustrated in FIGS. 1 and 2, AB gate 120 shares a drain region (e.g., drain region 114) with RST gate 106. Placing AB gate 120 inside STI 112A and sharing drain region 114 provides AB functionality in pixel 100 with little to no area penalty for the pixel. With STI silicon oxide 220 along the sidewalls of polysilicon 222 of AB gate 120, photoelectrons from photodiode 102 will not transfer to AB gate 120 without a driving potential between the photodiode and the AB gate. In various embodiments, biasing of AB gate 120 (or drain region 114) may be implemented to provide a potential that drives photoelectrons through STI silicon oxide 220.

Figure 3:
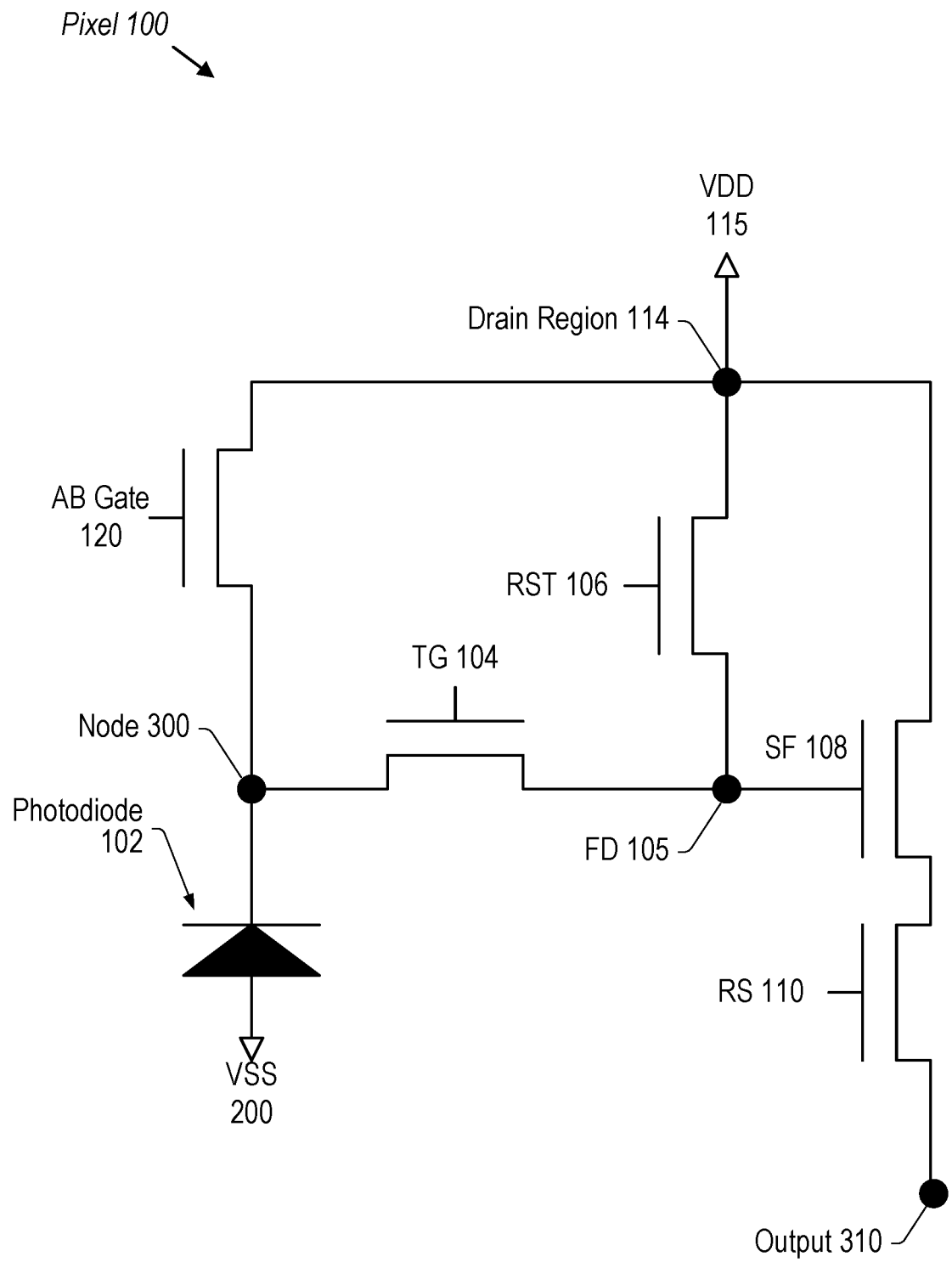
FIG. 3 is a schematic diagram for a pixel, according to some embodiments.

FIG. 3 is a schematic diagram for pixel 100, according to some embodiments. In the illustrated embodiment, pixel 100 includes photodiode 102 coupled to ground (e.g., Vss 200). Node 300 connects photodiode 102 to the source of TG 104 and the source of AB gate 120. Node 300 may include, for example, a p-type well region in substrate 101. The drain of AB gate 120 is coupled to drain region 114 (e.g., drain node) along with the drain of RST gate 106. Drain region 114 is coupled to Vdd 115 (e.g., a supply voltage). The drain of TG 104 is connected to FD region 105 along with the source of RST gate 106. FD region 105 is also connected to SF gate 108, which has a drain connected to drain region 114 and a source shared with RS gate 110. The drain of RS gate 110 is then connection to output 310, which provides signal output from pixel 100 during readout of the pixel.

In various embodiments, biasing of AB gate 120 turns on/off the AB transistor. For instance, biasing AB gate 120 to a potential above the transistor threshold turns on AB gate 120 while AB gate 120 is turned off when the potential is below the transistor threshold. When AB gate 120 is turned on, a channel through AB gate 120 and between photodiode 102 and the AB drain (e.g., drain region 114) is induced through STI 112A and photoelectrons can transfer from photodiode 102 to drain region 114. Thus, when AB gate 120 is turned on, the AB gate may enable blooming current (e.g., photoelectrons overflowing photodiode 102) to flow to drain region 114 and Vdd 115 instead of to neighboring pixels. When AB gate 120 is turned off, the channel through AB gate 120 and between photodiode 102 and drain region 114 is closed, inhibiting photoelectrons from transferring to the drain region through AB gate 120. Accordingly, various embodiments may be contemplated where the bias to AB gate 120 is modulated (e.g., controlled) to provide desired operation of the AB transistor and its AB functionality during specified periods of operation of pixel 100.

Figure 4:
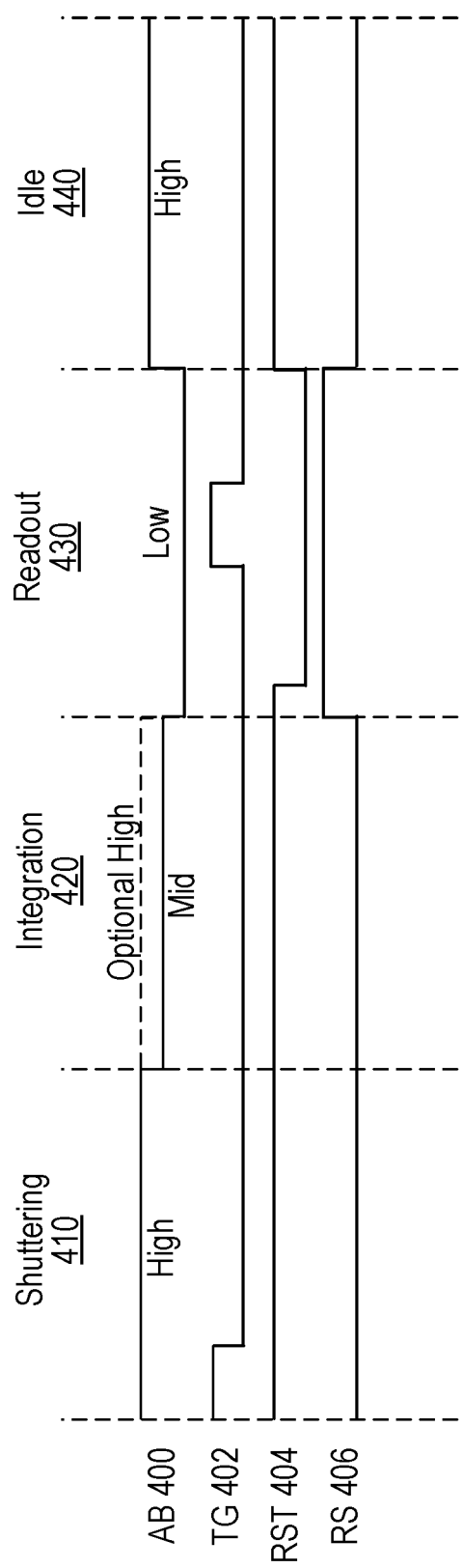
FIG. 4 depicts a timing diagram for operation of transistors in a pixel, according to some embodiments.

FIG. 4 depicts a timing diagram for operation of transistors in pixel 100, according to some embodiments. In the illustrated embodiment, curve 400 is the operation curve of the AB transistor (e.g., transistor of AB gate 120), curve 402 is the operation curve of the transfer gate transistor (e.g., transistor of TG 104), curve 404 is the operation curve of the reset transistor (e.g., transistor of RST gate 106), and curve 406 is the operation curve of the row selection transistor (e.g., transistor of RS gate 110). During operation of pixel 100, the pixel may go through 4 (four) time periods of operation—shuttering 410, integration 420, readout 430, and idle 440. Shuttering 410 is a time period of operation during which all photoelectrons are drained out from photodiode 102 (e.g., the photodiode is reset). Integration 420 is a time period of operation during which photoelectrons are accumulated in photodiode 102 (e.g., by exposing the photodiode to light to generate photoelectrons and inhibiting photoelectrons from transferring out of the photodiode). Readout 430 is a time period of operation during which a signal is read out from pixel 100. During readout 430, photoelectrons are transferred out of photodiode 102 into FD region 105 through TG 104. Idle 440 is a time period of operation during which pixel 100 idles after readout 430 and before resetting of photodiode 102 in shuttering 410.

As shown in the timing diagram of FIG. 4, shuttering 410 includes a pulse of the TG transistor (curve 402) for a brief period while the AB transistor (curve 400) and the reset transistor (curve 404) are turned on to pass photoelectrons through these transistors while the row selection transistor (curve 406) is turned off. Thus, any photoelectrons released during the pulse of the TG transistor are transferred to the drain (e.g., Vdd 115) through the AB transistor and the reset transistor. The pulse of the TG transistor may be set to be long enough to drain all photoelectrons from photodiode 102.

After resetting the photodiode 102 in shuttering 410, operation of the pixel may switch to integration 420. During integration, photodiode 102 is exposed to light to generate photoelectrons in the photodiode. This operation is to accumulate photoelectrons in photodiode 102 to later generate a signal for readout from pixel 100. Thus, during integration 420, the TG transistor (curve 402) is kept off to inhibit photoelectrons from transferring through the TG transistor. The reset transistor (curve 404) may be left on to allow any photoelectrons that may pass through the TG transistor to pass to drain region 114 and Vdd 115.

In certain embodiments, anti-blooming operation is desired during integration 420. Thus, as shown in FIG. 4, the AB transistor (curve 400) is turned on at least a mid-level. The AB transistor is turned on to maintain a potential difference between the AB transistor and the TG transistor (which is off) to create a pathway for photoelectrons that may release from photodiode 102 due to oversaturation of the photodiode. The mid-level of curve 400 may be, for example, be a potential slightly above the transistor threshold to induce a channel for photoelectrons through the AB transistor (as described above). With the mid-level, the AB transistor may be partially on at a sufficient enough level to create a path to avoid oversaturation of photodiode 102. In some embodiments, as shown in FIG. 4, the AB transistor may optionally be turned on to the high level during integration 420 (e.g., the high level of shuttering 410). At the high level, the potential driving photoelectrons through the channel is higher (e.g., there is less of a barrier to photoelectrons transferring through the AB transistor from photodiode 102 to drain region 114). Thus, the high level of the AB transistor may be used in pixel designs where blooming is of greater concern.

After accumulation of photoelectrons in integration 420, the operation of pixel 100 may shift to readout 430. In readout 430, the reset transistor (curve 404) is turned off and the TG transistor (curve 402) is pulsed for a short period to transfer photoelectrons from photodiode 102 to FD region 105. FD region 105 accumulates charges from the photoelectrons that is then readout as an analog signal from pixel 100. To allow the analog signal to be readout, the row selection transistor (curve 406) is turned on, which allows the analog signal to transfer from FD region 105 to output 310 (shown in FIG. 3) at the drain of the row selection transistor. During readout 430, the AB transistor (curve 400) is held at a low (or off) value to inhibit photoelectrons from transferring through the AB transistor to drain region 114 and Vdd 115. The low level of the AB transistor is implemented to turn off the channel for photoelectron transfer through the AB transistor and STI 112A to avoid losing signal to the drain. For example, preventing photoelectrons from going through the AB transistor directs more photoelectrons through the TG transistor and to FD region 105 to increase the signal in the FD region.

After readout 430 is completed, the operation of pixel 100 shifts to idle 440. In idle 440, the AB transistor (curve 400) is turned back to a high level to drain any photoelectrons remaining at node 300 (shown in FIG. 3). The reset transistor (curve 404) is also turned on to drain any remaining photoelectrons from FD region 105.

In various embodiments, as described above, the potential (e.g., voltage level) of the AB transistor may be changed by changing (e.g., modulating) the bias on AB gate 120. For instance, AB gate 120 may be partially turned on by providing a bias that changes the potential of the AB transistor to slightly above the transistor threshold. Increasing the potential further (e.g., by increasing the bias) places the AB transistor at a higher potential and the AB transistor in a more active mode. For instance, at some higher potential, the AB transistor may be fully turned on. In some contemplated embodiments, the AB transistor may be designed to have a high transistor threshold such that any possible bias that may be applied to the AB transistor in pixel 100 only partially turns on the AB transistor. Changing the bias and/or changing the transistor threshold may be implemented to control the level of anti-blooming provided by the AB transistor.

In certain embodiments, pixel 100, as shown and described in FIGS. 1-3, includes an AB gate (e.g., AB gate 120) that is formed in an already existing STI (e.g., STI 112A) that provides isolation for other transistor gates (e.g., RST gate 106). Additional embodiments may be contemplated where an additional STI may be added to a pixel design to enable positioning of both the AB gate and the AB drain outside of the boundary of photodiode 102 but within the boundaries of the pixel (e.g., the boundaries of the pixel cell).

Figure 5:
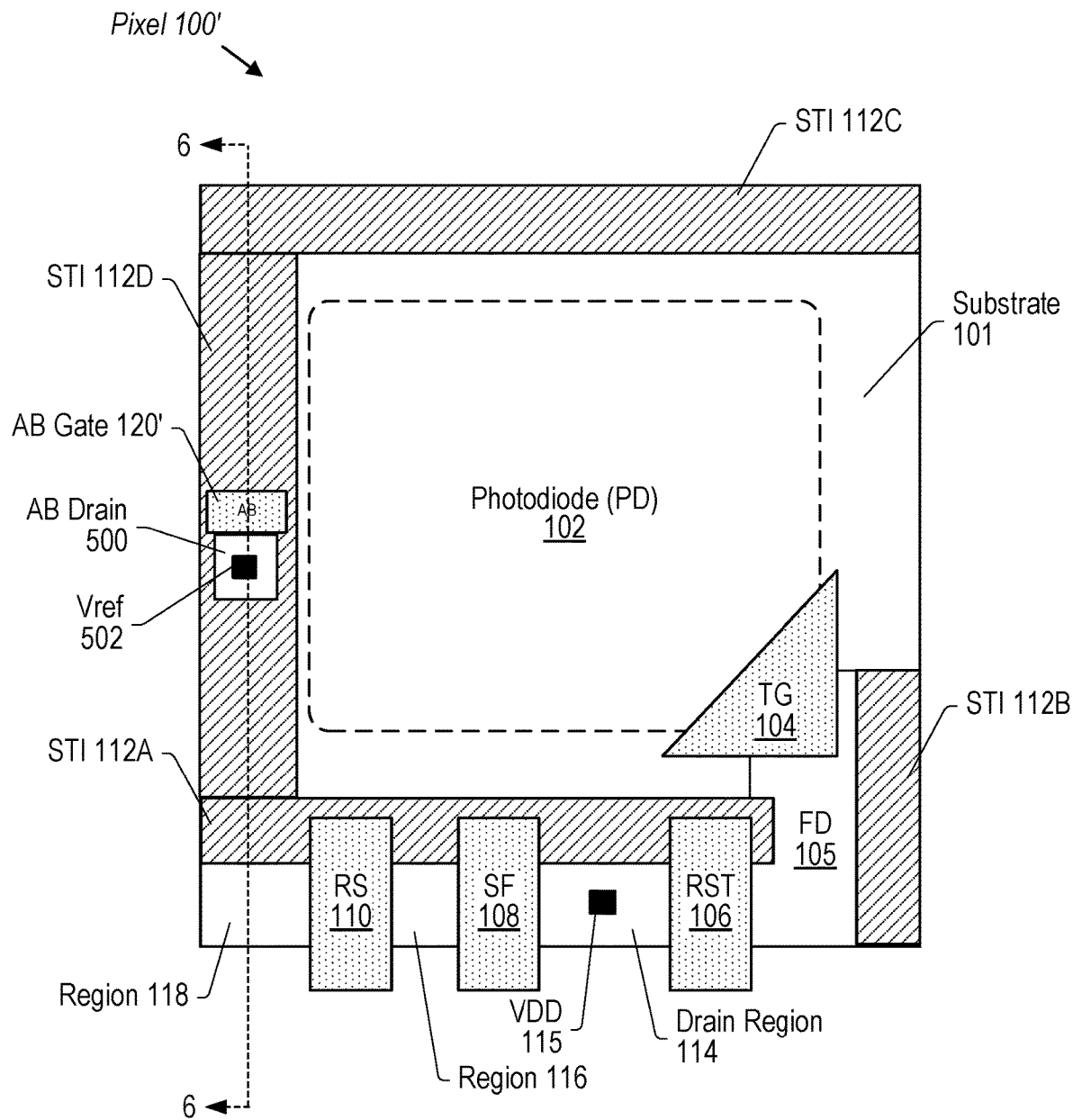
FIG. 5 is a top plan view of another example pixel of an image sensor, according to some embodiments.

FIG. 5 is a top plan view of another example pixel of an image sensor, according to some embodiments. In the illustrated embodiment, pixel 100' (similar to pixel 100, shown in FIG. 1) includes photodiode (PD) 102, transfer gate (TG) 104, floating diffusion (FD) region 105 (e.g., FD node), reset (RST) gate 106, source follower (SF) gate 108, and row selection (RS) gate 110. As with pixel 100, pixel 100' includes STI 112A, STI 112B, and STI 112C. In certain embodiments, pixel 100' includes an additional STI—STI 112D. STI 112D may be formed along a boundary of pixel 100', as shown in FIG. 5. In some embodiments, STI 112D is formed perpendicular to STI 112C. Accordingly, STI 112D is formed along the boundary of pixel 100' that is perpendicular to the boundary that is on the other side of STI 112A relative to photodiode 102 (e.g., STI 112D is along the left vertical boundary that is perpendicular to the bottom horizontal boundary in the illustration of FIG. 5).

Figure 6:
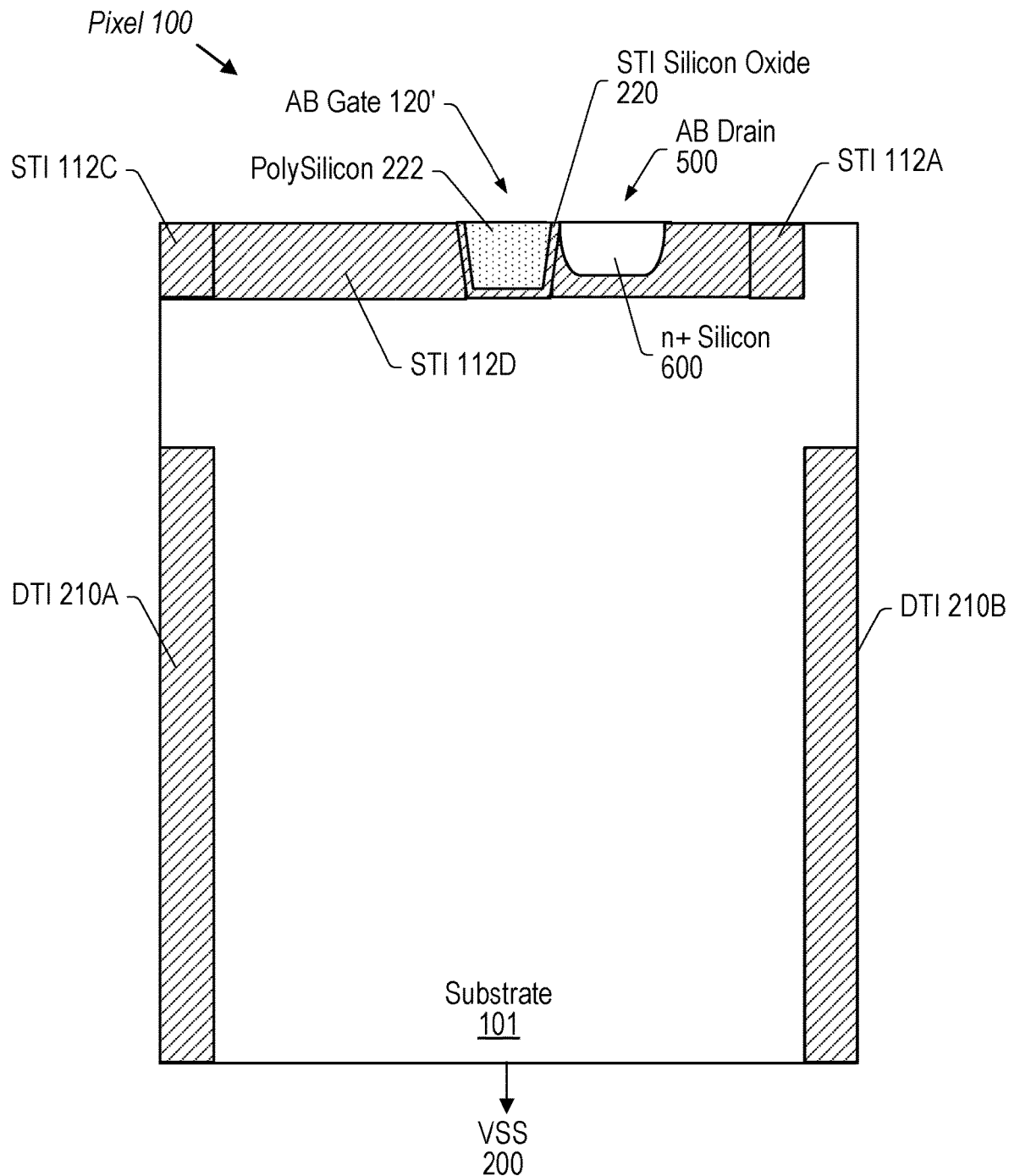
FIG. 6 depicts a cross-sectional view representation of another pixel along the line 6-6 shown in FIG. 5, according to some embodiments.

In certain embodiments, pixel 100' includes AB (antiblooming) gate 120' and AB drain 500 formed in STI 112D. FIG. 6 depicts a cross-sectional view representation of pixel 100' along the line 6-6 shown in FIG. 5, according to some embodiments. As shown in FIG. 5, line 6-6 is a cross-sectional line through AB gate 120' and AB drain 500. AB gate 120' may be formed, as shown in FIGS. 5 and 6, within the horizontal boundaries of STI 112D. In various embodiments, AB gate 120' is formed by replacing a portion of the STI dielectric (e.g., STI silicon oxide 220) inside STI 112D with polysilicon 222. For example, STI silicon oxide 220 may be removed from the portion of the STI 112D (also shown in FIG. 5) intended for AB gate 120' to form a well (e.g., trench) that is then filled with polysilicon 222. When the well for AB gate 120' is formed, at least some STI silicon oxide 220 is left along the sidewalls of the well. Thus, when polysilicon 222 is filled into the well to form AB gate 120', the AB gate is isolated along its sidewalls.

In various embodiments, AB drain 500 is formed, as shown in FIGS. 5 and 6, within the horizontal boundaries of STI 112D. In various embodiments, AB drain 500 is formed by replacing a portion of the STI dielectric (e.g., STI silicon oxide 220) inside STI 112D with n-type doped silicon 600. For example, STI silicon oxide 220 may be removed from the portion of the STI 112D (also shown in FIG. 5) intended for AB drain 500 to form a well that is then filled with n-type doped silicon 600. As shown in FIG. 6, when AB gate 120' and AB drain 500 are formed in STI 112D, at least some STI silicon oxide 220 is left between the gate and drain to isolate the gate from the drain.

In the embodiment of pixel 100' illustrated in FIGS. 5 and 6, AB gate 120' has its own dedication drain region—AB drain 500. Thus, AB gate 120' does not share a drain region with any other transistor in pixel 100' and can receive its own reference voltage—Vref 502, as shown in FIG. 5. While placing AB gate 120' and AB drain 500 inside STI 112D adds some complexity to the design of pixel 100', AB gate 120' and AB drain 500 provide AB functionality in pixel 100' with little area penalty for the pixel and with the AB gate and the AB drain still within the boundaries of the pixel. With STI silicon oxide 220 along the sidewalls of polysilicon 222 of AB gate 120' and AB drain 500, photoelectrons from photodiode 102 will not transfer to AB gate 120 without a driving potential between the photodiode and the AB gate. In some embodiments, similarly to AB gate 120, biasing of AB gate 120' may be implemented to provide a potential that drives photoelectrons through STI silicon oxide 220 and into AB drain 500. In such embodiments, Vref 502 may be held at a constant voltage.

Figure 7:
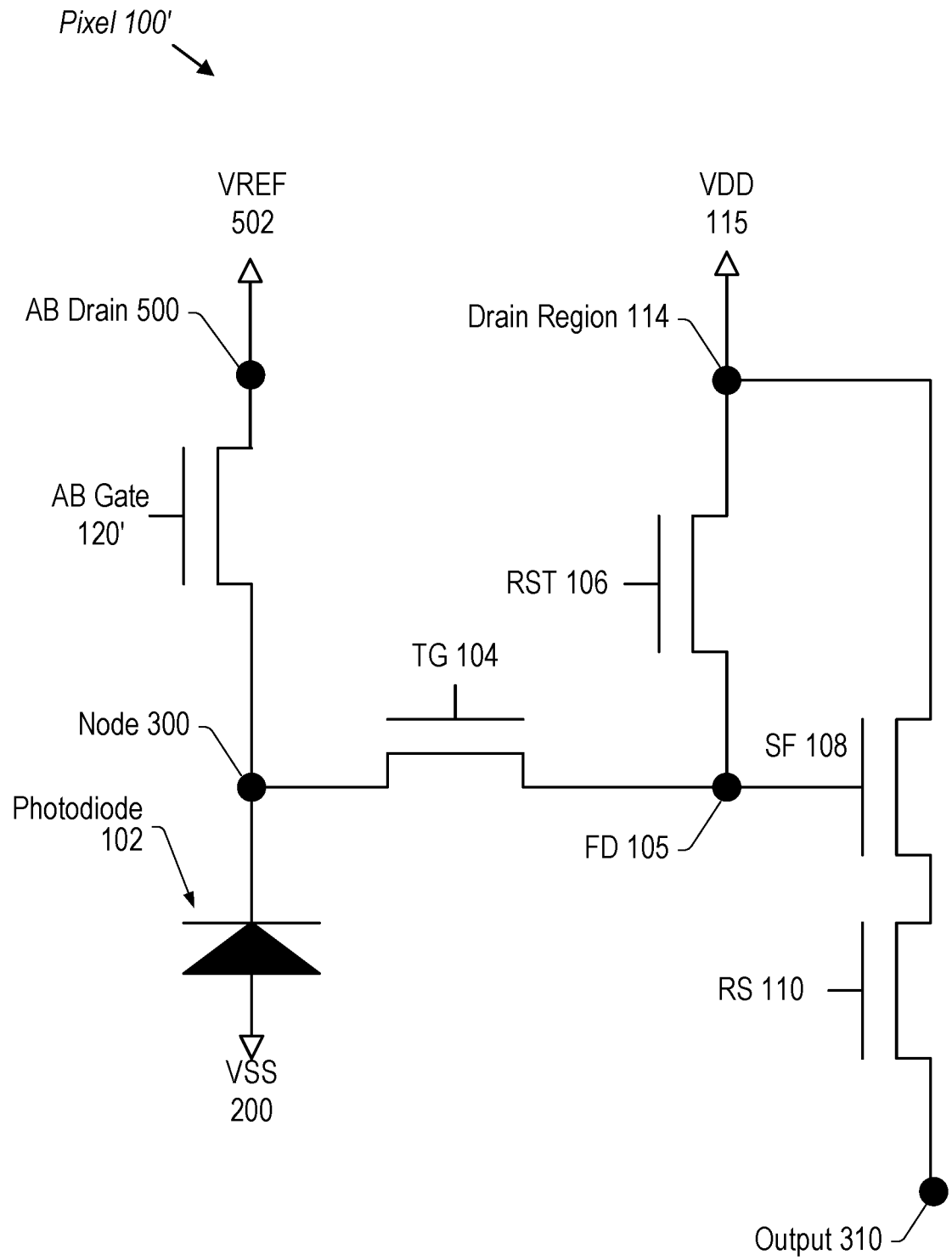
FIG. 7 is a schematic diagram for another pixel, according to some embodiments.

FIG. 7 is a schematic diagram for pixel 100', according to some embodiments. In the illustrated embodiment, pixel 100' includes photodiode 102 coupled to ground (e.g., Vss 200). As with pixel 100 (shown in FIG. 3), node 300 connects photodiode 102 to the source of TG 104 and the source of AB gate 120'. Differently from pixel 100, the drain of AB gate 120' in pixel 100', as shown in FIG. 7, is coupled to AB drain 500, which is connected to Vref 502. The connections of other gates (e.g., TG 104, RST gate 106, SF gate 108, and RS gate 110) remain the same as for pixel 100.

With AB drain 500 and the AB transistor having its own dedicated reference voltage, Vref 502, some embodiments may be contemplated where the AB transistor potential is modulated by modulating Vref 502 instead of or in addition to modulation of the bias on AB gate 120'. For example, Vref 502 may be modulated (e.g., changed) to turn on/off the flow of photocurrent from photodiode 102 through the AB transistor (e.g., through AB gate 120' and AB drain 500 to Vref 502). In some embodiments, if Vref 502 is lowered below the voltage of photodiode 102, photocurrent (e.g., photoelectrons) will stop flowing from photodiode 102. Raising Vref 502 above the voltage of photodiode 102 turns on the photocurrent and enables anti-blooming functionality of the AB transistor by allowing photoelectrons to transfer from photodiode 102 to AB drain 500 and Vref 502. Accordingly, modulating Vref 502 turns on/off the AB transistor for the flow of photoelectrons (e.g., photocurrent) and controls the anti-blooming functionality of the AB transistor.

Figure 8:
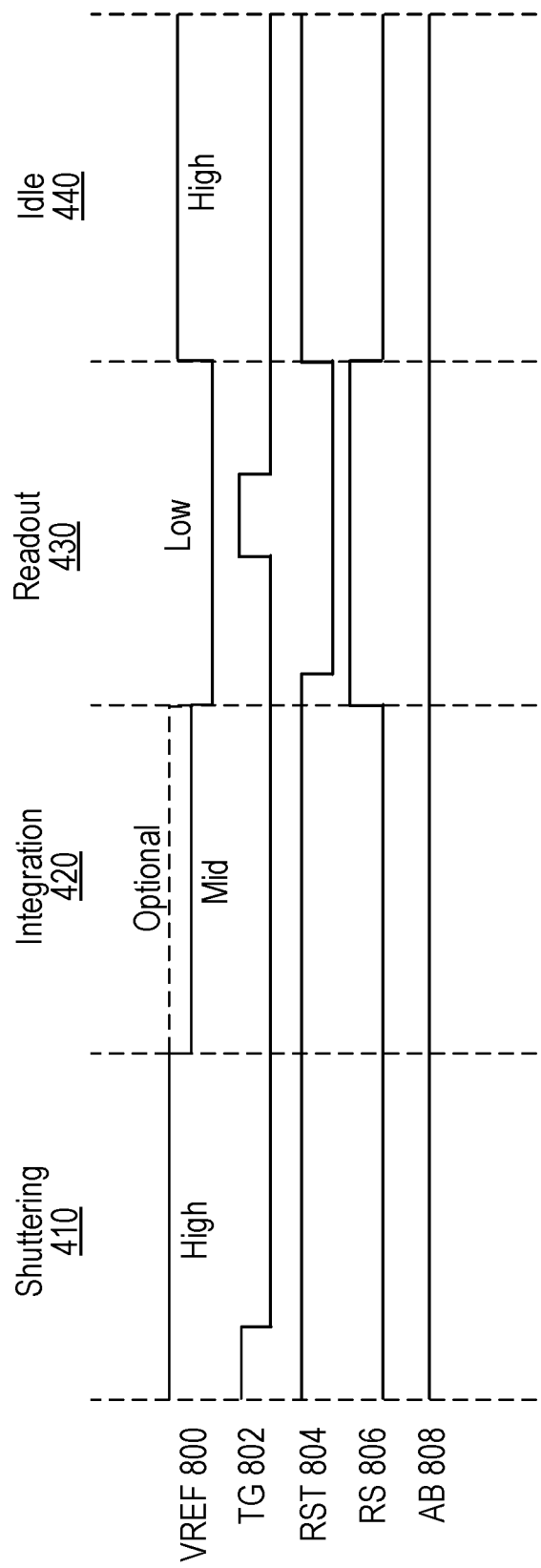
FIG. 8 depicts a timing diagram for operation of transistors in another pixel, according to some embodiments.

As described above, embodiments are contemplated for pixel 100' where Vref 502 is held constant and biasing of AB gate 120' controls the anti-blooming functionality of the AB transistor. When Vref 502 is held constant and biasing of AB gate 120' controls the anti-blooming functionality of the AB transistor, the timing diagram of FIG. 4 may be implemented for pixel 100'. In embodiments where Vref 502 is modulated, a different timing diagram for operation of pixel 100' may be implemented. FIG. 8 depicts a timing diagram for operation of transistors in pixel 100', according to some embodiments. In the illustrated embodiment, curve 800 is the operation curve of the reference voltage for the AB transistor (e.g., Vref 502), curve 802 is the operation curve of the transfer gate transistor (e.g., transistor of TG 104), curve 804 is the operation curve of the reset transistor (e.g., transistor of RST gate 106), curve 806 is the operation curve of the row selection transistor (e.g., transistor of RS gate 110), and curve 808 is the operation curve of the AB transistor gate (e.g., AB gate 120').

As with pixel 100, pixel 100' may go through the 4 (four) time periods of operation—shuttering 410, integration 420, readout 430, and idle 440. As shown in the timing diagram of FIG. 8, the AB transistor gate (curve 808 for AB gate 120') is held on during all four time periods of operation. Thus, in the timing diagram for pixel 100', there is no change in the bias to AB gate 120'. Turning to shuttering 410 in the timing diagram of FIG. 8, shuttering 410 includes a pulse of the TG transistor (curve 802) for a brief period while Vref 502 (curve 800) and the reset transistor (curve 804) are turned on to pass photoelectrons through the AB transistor and the reset transistor while the row selection transistor (curve 806) is turned off. Thus, any photoelectrons released during the pulse of the TG transistor are transferred to either the AB transistor drain (e.g., AB drain 500) through the AB transistor or the drain of the reset transistor (e.g., drain region 114). The pulse of the TG transistor may be set to be long enough to drain all photoelectrons from photodiode 102.

After resetting the photodiode 102 in shuttering 410, operation of the pixel may switch to integration 420. During integration, photodiode 102 is exposed to light to generate photoelectrons in the photodiode. This operation is to accumulate photoelectrons in photodiode 102 to later generate a signal for readout from pixel 100. Thus, during integration 420, the TG transistor (curve 802) is kept off to inhibit photoelectrons from transferring through the TG transistor. The reset transistor (curve 804) may be left on to allow any photoelectrons that may pass through the TG transistor to pass to drain region 114 and Vdd 115.

In certain embodiments, anti-blooming operation is desired during integration 420. Thus, as shown in FIG. 8, Vref 502 (curve 800) is turned on at least a mid-level. Vref 502 may be turned on to a voltage potential that is above the voltage potential of photodiode 102 to create a pathway for photoelectrons that may release from the photodiode due to oversaturation of the photodiode. The mid-level of curve 800 may be, for example, be a voltage potential at or near the voltage potential of photodiode 102 to induce a channel for photoelectrons through the AB transistor. With the mid-level, the difference in voltage between AB drain 500 and photodiode 102 may just be sufficient to create a path to avoid oversaturation of photodiode 102. In some embodiments, as shown in FIG. 8, Vref 502 may optionally be turned on to the high level during integration 420 (e.g., the high level of shuttering 410). At the high level, the difference in voltage potential driving photoelectrons through the channel is higher (e.g., there is less of a barrier to photoelectrons transferring through the AB transistor from photodiode 102 to AB drain 500). This high level for Vref 502 may be used in pixel designs where blooming is of greater concern.

After accumulation of photoelectrons in integration 420, the operation of pixel 100' may shift to readout 430. In readout 430, the reset transistor (curve 804) is turned off and the TG transistor (curve 802) is pulsed for a short period to transfer photoelectrons from photodiode 102 to FD region 105. FD region 105 accumulates charges from the photoelectrons that is then readout as an analog signal from pixel 100'. To allow the analog signal to be readout, the row selection transistor (curve 806) is turned on, which allows the analog signal to transfer from FD region 105 to output 310 (shown in FIG. 7) at the drain of the row selection transistor. During readout 430, Vref 502 (curve 800) is held at a low value to inhibit the loss of photoelectrons (and signal) through the AB transistor to AB drain region 500. In certain embodiments, Vref 502 is held at a low level and not turned off to inhibit reverse flow of current from AB drain 500 to photodiode 102 or FD region 105. After readout 430 is completed, the operation of pixel 100' shifts to idle 440. In idle 440, Vref 502 (curve 800) is turned back to a high level to drain any photoelectrons remaining at node 300 (shown in FIG. 7). The reset transistor (curve 804) is also turned on to drain any remaining photoelectrons from FD region 105.

Figure 9:
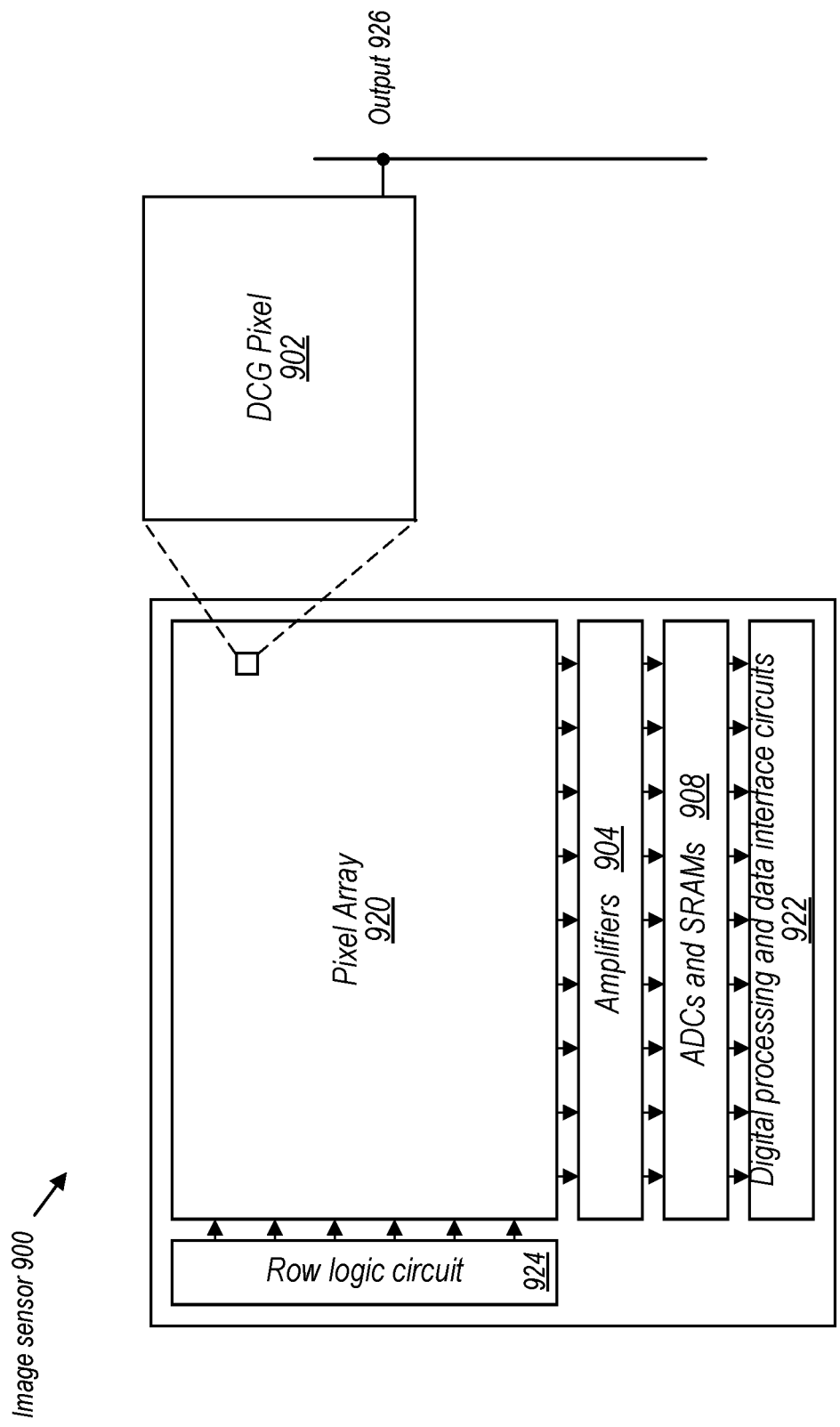
FIG. 9 is a schematic diagram of an example image sensor, according to some embodiments.

FIG. 9 is a schematic diagram of an example image sensor, according to some embodiments. As shown in FIG. 9, image sensor 900 may include a plurality of light-gathering pixels 902 (e.g., similar to pixel 100 or pixel 100') organized as a pixel array 920. In some embodiments, image sensor 900 may include one or more amplifiers 904, one or more ADC (analog-to-digital conversion) circuits and memory 908, and one or more image signal processing and data interface circuits 922. In some embodiments, image signals of pixels 902 of pixel array 920 may be read out row-by-row or column-by-column (or even pixel-by-pixel). For purposes of illustration, in this example, image sensor 900 may also include row logic circuit 924 to provide control signals to perform row-by-row readout of pixels 902. Using the row-by-row readout, pixels 902 on the same row may be read out at or around the same time, whereas pixels 902 on the same column but different rows may be read out sequentially one row after another.

In some embodiments, the above readout of image signals of pixels 902 may be implemented using one or more readout circuits. For example, at least some of pixels 902 (e.g., pixel 100 or pixel 100') may each include a photodiode and a pixel readout circuit. The photodiode may generate and accumulate photoelectrons when exposed to light. During readout, under control signals from row logic circuit 924, a row selection transistor and a source follower transistor (e.g., RS gate 110 and SF gate 108, shown in FIGS. 1-3 and 5-7) may be turned on and release analog signal output through output 926 (similar to output 310 in FIGS. 3 and 7). Output 926 may be coupled to a floating diffusion region (such as FD region 105) that, depending on the state of a transfer gate (such as TG 104) and a reset gate (such as RST gate 106) may output an analog output signal with a reset value or a signal value.

For example, during readout and with respect to the embodiment of pixel 100 shown in FIGS. 1-3, under control signals from row logic circuit 924, RS gate 110, SF gate 108, and RST gate 106 may be turned on. Thus, a reset voltage (e.g., VDD 115) may be coupled with FD region 105, and FD region 105 may be coupled with the pixel signal output line (e.g., output 310). The voltage of FD region 105 (e.g., having a value of the reset voltage VDD) may be amplified by amplifiers 904, sampled by ADC circuits 908, and stored by memory 908. In some embodiments, this may be the first sample of a digital CDS (correlated double sampling) or the reset value. Then, under control signals from row logic circuit 924, RST gate 106 may be turned off, and TG 104 may be turned on. Thus, the photoelectrons of photodiode 102 may transfer out of the photodiode to a capacitance of FD region 105. The transfer of photoelectrons may cause a current flowing through the capacitance and thus result in an analog voltage, which may be further amplified by amplifiers 904, sampled by ADC circuits 908, and stored by memory 908. This may be the second sample of the CDS or the signal value. Thus, a CDS circuit, as part of image signal processing and data interface circuits 922, may subtract the first sample from the second sample to cancel out effects of the reset voltage (e.g., VDD 115) to determine a final digital signal value of the pixel 100. These operations may be repeated on different pixels, e.g., according to the rows or columns, to generate final digital signal values for all the pixels in pixel array 920 that may be further processed to produce a digital image.

Figure 10:
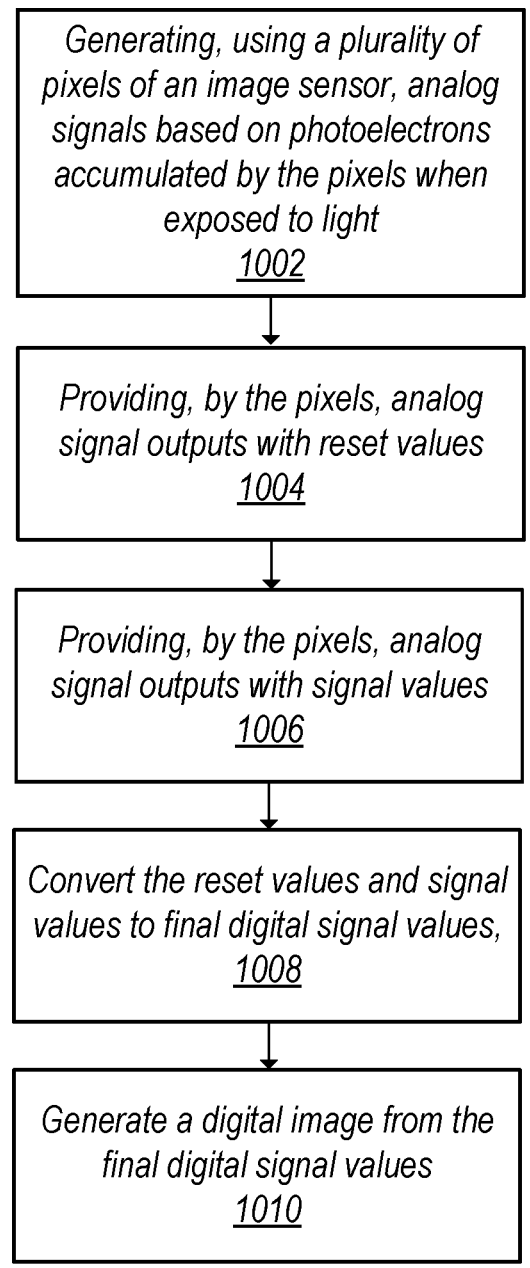
FIG. 10 is a flowchart showing an example method for processing image signals of an image sensor to generate a digital image, according to some embodiments.

FIG. 10 is a flowchart showing an example method for processing image signals of an image sensor to generate a digital image, according to some embodiments. In FIG. 10, in some embodiments, in a photodiode of at least one pixel on an image sensor, photoelectrons are accumulated in response to the at least one pixel being exposed to light, as shown by block 1002. During readout, these photoelectrons may transfer out of the photodiodes to generate analog signal outputs (e.g., analog voltage outputs) at FD regions of the pixels, which may be further accessed at the output of the pixels. In FIG. 10, in some embodiments, the pixels provide analog signal outputs with reset values at block 1004. At block 1006, the pixels provide analog signal outputs with signal values. Then, at block 1008, the reset values and the signal values are converted to final digital signal values. In various embodiments, the final digital signal values are generated by a combination of ADCs, SRAMs, digital processing circuits, and data interface circuits. At block 1010, a digital image is generated from the final digital signal values. For example, digital processing circuits and/or data interface circuits may generate the digital image from the final digital signal values.

Figure 11:
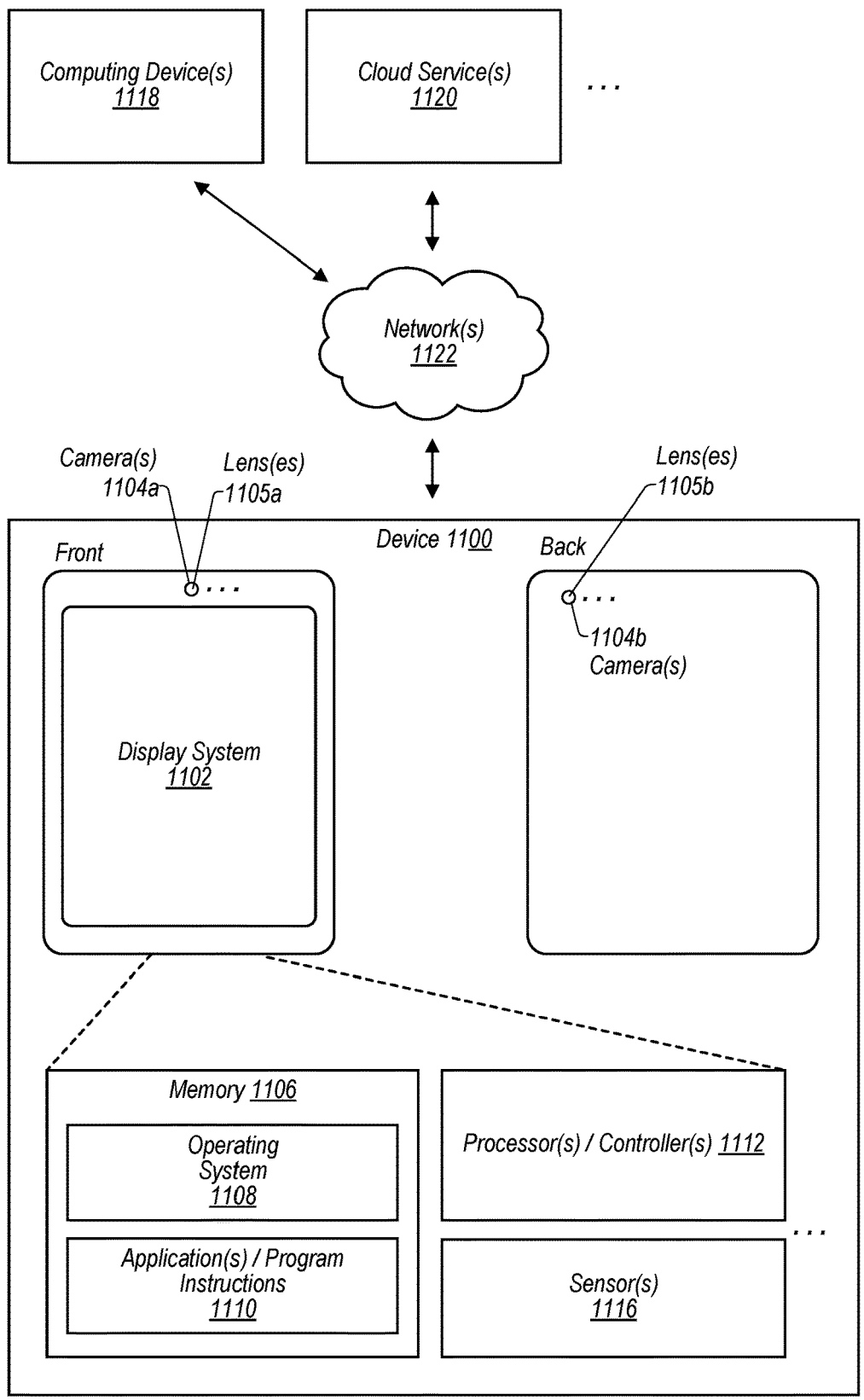
FIG. 11 illustrates a schematic representation of an example device that may include an image capturing device (e.g., a camera) having an image sensor, according to some embodiments.

FIG. 11 illustrates a schematic representation of an example device 1100 that may include an image capturing device (e.g., a camera) having an image sensor, according to some embodiments. In some embodiments, the device 1100 may be a mobile device and/or a multifunction device. In various embodiments, the device 1100 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In some embodiments, the device 1100 may include a display system 1102 (e.g., comprising a display and/or a touch-sensitive surface) and/or one or more cameras 1104. In some non-limiting embodiments, the display system 1102 and/or one or more front-facing cameras 1104a may be provided at a front side of the device 1100, e.g., as indicated in FIG. 11. Additionally, or alternatively, one or more rear-facing cameras 1104b may be provided at a rear side of the device 1100. In some embodiments comprising multiple cameras 1104, some or all of the cameras may be the same as, or similar to, each other. Additionally, or alternatively, some or all of the cameras may be different from each other. In various embodiments, the location(s) and/or arrangement(s) of the camera(s) 1104 may be different than those indicated in FIG. 11. In various embodiments, cameras 1104 include lens(es) 1105. Image sensors (e.g., image sensor 900) may receive light that passes through lens(es) 1105 to reach the image sensors.

Among other things, the device 1100 may include memory 1106 (e.g., comprising an operating system 1108 and/or application(s)/program instructions 1110), one or more processors and/or controllers 1112 (e.g., comprising CPU(s), memory controller(s), display controller(s), and/or camera controller(s), etc.), and/or one or more sensors 1116 (e.g., orientation sensor(s), proximity sensor(s), and/or position sensor(s), etc.). In some embodiments, the device 1100 may communicate with one or more other devices and/or services, such as computing device(s) 1118, cloud service(s) 1120, etc., via one or more networks 1122. For example, the device 1100 may include a network interface that enables the device 1100 to transmit data to, and receive data from, the network(s) 1122. Additionally, or alternatively, the device 1100 may be capable of communicating with other devices via wireless communication using any of a variety of communications standards, protocols, and/or technologies.

Figure 12:
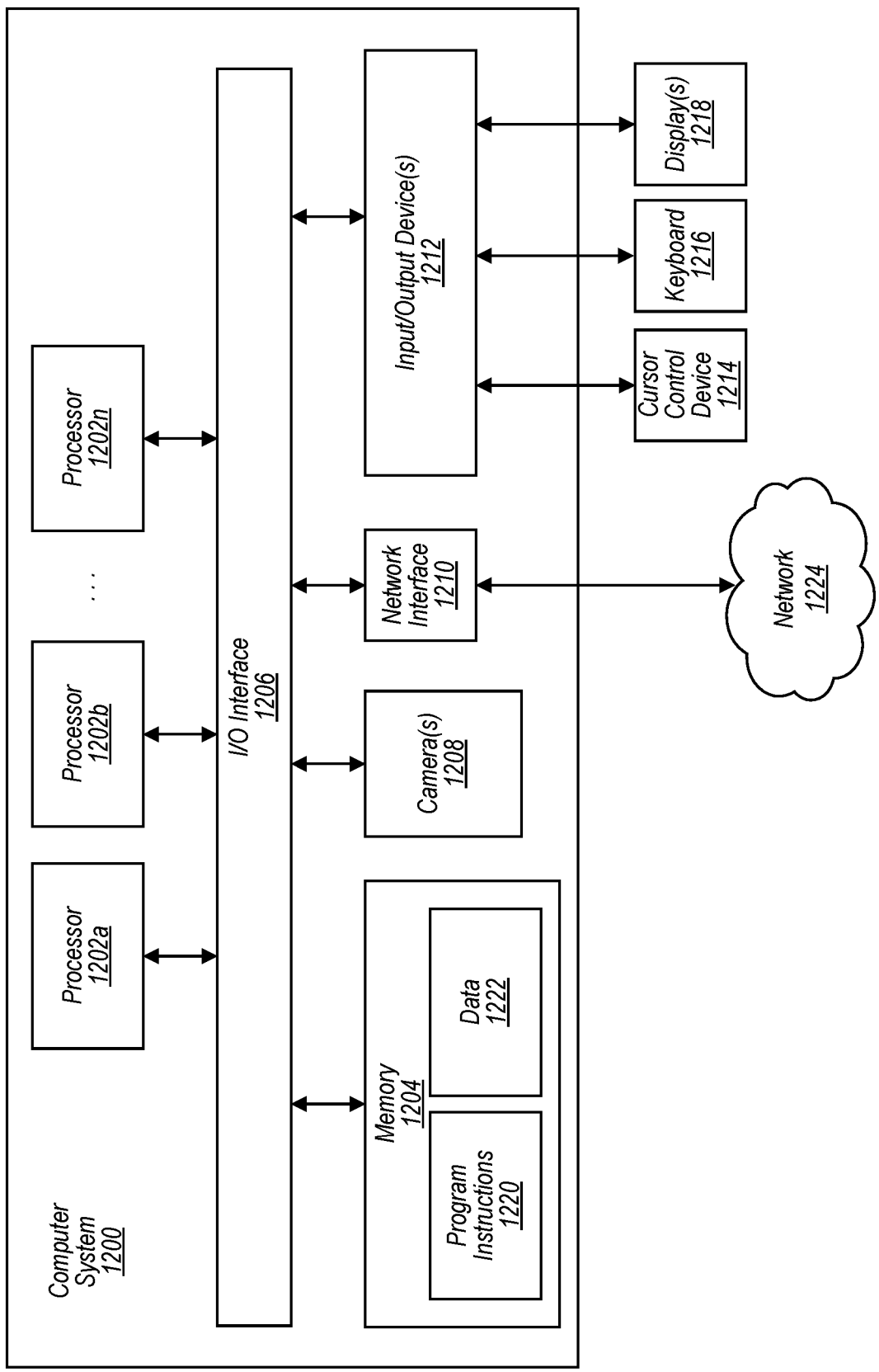
FIG. 12 illustrates a schematic block diagram of an example computing device that may include or host embodiments of an image capturing device (e.g., a camera) having an image sensor, according to some embodiments.

FIG. 12 illustrates a schematic block diagram of an example computing device, referred to as computer system 1200, that may include or host embodiments of an image capturing device (e.g., a camera) having an image sensor, according to some embodiments. In addition, computer system 1200 may implement methods for controlling operations of the camera and/or for performing image processing images captured with the camera. In some embodiments, the device 1200 (described herein with reference to FIG. 12) may additionally, or alternatively, include some or all of the functional components of the computer system 1200 described herein.

The computer system 1200 may be configured to execute any or all of the embodiments described above. In different embodiments, computer system 1200 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In the illustrated embodiment, computer system 1200 includes one or more processors 1202 coupled to a system memory 1204 via an input/output (I/O) interface 1206. Computer system 1200 further includes one or more cameras 1208 coupled to the I/O interface 1206. Computer system 1200 further includes a network interface 1210 coupled to I/O interface 1206, and one or more input/output devices 1212, such as cursor control device 1214, keyboard 1216, and display(s) 1218. In some cases, it is contemplated that embodiments may be implemented using a single instance of computer system 1200, while in other embodiments multiple such systems, or multiple nodes making up computer system 1200, may be configured to host different portions or instances of embodiments. For example, in one embodiment some elements may be implemented via one or more nodes of computer system 1200 that are distinct from those nodes implementing other elements.

In various embodiments, computer system 1200 may be a uniprocessor system including one processor 1202, or a multiprocessor system including several processors 1202 (e.g., two, four, eight, or another suitable number). Processors 1202 may be any suitable processor capable of executing instructions. For example, in various embodiments processors 1202 may be general-purpose or embedded processors implementing any of a variety of instruction set architectures (ISAs), such as the x86, PowerPC, SPARC, or MIPS ISAs, or any other suitable ISA. Also, in some embodiments, one or more of processors 1202 may include additional types of processors, such as graphics processing units (GPUs), application specific integrated circuits (ASICs), etc. In multiprocessor systems, each of processors 1202 may commonly, but not necessarily, implement the same ISA. In some embodiments, computer system 1200 may be implemented as a system on a chip (SoC). For example, in some embodiments, processors 1202, memory 1204, I/O interface 1206 (e.g. a fabric), etc. may be implemented in a single SoC comprising multiple components integrated into a single chip. For example, an SoC may include multiple CPU cores, a multi-core GPU, a multi-core neural engine, cache, one or more memories, etc. integrated into a single chip. In some embodiments, an SoC embodiment may implement a reduced instruction set computing (RISC) architecture, or any other suitable architecture.

System memory 1204 may be configured to store program instructions 1220 accessible by processor 1202. In various embodiments, system memory 1204 may be implemented using any suitable memory technology, such as static random access memory (SRAM), synchronous dynamic RAM (SDRAM), nonvolatile/Flash-type memory, or any other type of memory. Additionally, existing camera control data 1222 of memory 1204 may include any of the information or data structures to implement the techniques described above. In some embodiments, program instructions 1220 and/or data 1222 may be received, sent or stored upon different types of computer-accessible media or on similar media separate from system memory 1204 or computer system 1200. In various embodiments, some or all of the functionality described herein may be implemented via such a computer system 1200.

In one embodiment, I/O interface 1206 may be configured to coordinate I/O traffic between processor 1202, system memory 1204, and any peripheral devices in the device, including network interface 1210 or other peripheral interfaces, such as input/output devices 1212. In some embodiments, I/O interface 1206 may perform any necessary protocol, timing or other data transformations to convert data signals from one component (e.g., system memory 1204) into a format suitable for use by another component (e.g., processor 1202). In some embodiments, I/O interface 1206 may include support for devices attached through various types of peripheral buses, such as a variant of the Peripheral Component Interconnect (PCI) bus standard or the Universal Serial Bus (USB) standard, for example. In some embodiments, the function of I/O interface 1206 may be split into two or more separate components, such as a north bridge and a south bridge, for example. Also, in some embodiments some or all of the functionality of I/O interface 1206, such as an interface to system memory 1204, may be incorporated directly into processor 1202.

Network interface 1210 may be configured to allow data to be exchanged between computer system 1200 and other devices attached to a network 1224 (e.g., carrier or agent devices) or between nodes of computer system 1200. Network 1224 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1210 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1212 may, in some embodiments, include one or more display terminals, keyboards, keypads, touchpads, scanning devices, voice or optical recognition devices, or any other devices suitable for entering or accessing data by one or more computer systems 1200. Multiple input/output devices 1212 may be present in computer system 1200 or may be distributed on various nodes of computer system 1200. In some embodiments, similar input/output devices may be separate from computer system 1200 and may interact with one or more nodes of computer system 1200 through a wired or wireless connection, such as over network interface 1210.

Those skilled in the art will appreciate that computer system 1200 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1200 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1200 may be transmitted to computer system 1200 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A pixel, comprising:
   a silicon substrate;
   a photodiode formed in the substrate;
   a first shallow trench isolation formed in the substrate, the first shallow trench isolation being filled with silicon oxide and at least partially positioned between the photodiode and a first boundary of the pixel in a horizontal dimension of the pixel; and
   an anti-blooming (AB) transistor, wherein the AB transistor includes:
      a gate formed by polysilicon positioned inside a portion of the silicon oxide of the first shallow trench isolation; and
      a drain positioned outside the portion of the silicon oxide of the first shallow trench isolation, the drain being isolated from the gate by the silicon oxide.

2. The pixel of claim 1, further comprising:
   a drain region formed in the substrate, the drain region being positioned on a side of the first shallow trench isolation horizontally between the photodiode and the first boundary of the pixel;
   wherein the drain region includes the drain of the AB transistor.

3. The pixel of claim 2, further comprising:
   a reset gate formed above the substrate in a vertical dimension of the pixel, wherein the reset gate is at least partially above the first shallow trench isolation in the vertical dimension and at least partially above the drain region in the vertical dimension;
   wherein the reset gate shares the drain region with the AB transistor.

4. The pixel of claim 3, further comprising:
   a source follow gate formed above the substrate in the vertical dimension, wherein the source follow gate is at least partially above the first shallow trench isolation in the vertical dimension and at least partially above the drain region in the vertical dimension;

wherein the AB gate is positioned between the source follow gate and the reset gate in the horizontal dimension.

5. The pixel of claim 1, wherein the drain of the AB transistor is formed in an additional portion of the silicon oxide of the first shallow trench isolation, the drain being formed by doped silicon, and wherein the portion of the silicon oxide of the first shallow trench isolation isolating the gate and the drain is positioned between the doped silicon of the drain and the polysilicon of the gate.

6. The pixel of claim 5, further comprising:
a second shallow trench isolation formed in the substrate, the second shallow trench isolation being filled with silicon oxide and positioned between the photodiode and a second boundary of the pixel in the horizontal dimension, wherein the second boundary is perpendicular to the first boundary.

7. The pixel of claim 6, further comprising:
a drain region formed in the substrate, the drain region being positioned on a side of the second shallow trench isolation horizontally between the photodiode and the second boundary of the pixel;
a reset gate formed above the substrate in the vertical dimension, wherein the reset gate is at least partially above the second shallow trench isolation in the vertical dimension and at least partially above the drain region in the vertical dimension; and
a source follow gate formed above the substrate in the vertical dimension, wherein the source follow gate is at least partially above the second shallow trench isolation in the vertical dimension and at least partially above the drain region in the vertical dimension, wherein the drain region is a drain of both the reset gate and the source follow gate.

8. The pixel of claim 1, wherein the AB transistor is configured to, at predetermined times, be provided with a higher potential than the photodiode to provide a path for photoelectrons to transfer out of the photodiode through the first shallow trench isolation.

9. The pixel of claim 1, further comprising:
a floating diffusion region formed in the substrate; and
a transfer gate formed above the substrate in a vertical dimension, the transfer gate being at least partially positioned above both the photodiode and the floating diffusion region.

10. The pixel of claim 9, wherein, when the transfer gate is turned on, the AB transistor is configured to be provided with a lower potential than the photodiode to inhibit photoelectrons from transferring out of the photodiode through the first shallow trench isolation.

11. The pixel of claim 1, wherein the gate of the AB transistor is positioned in a well in the shallow trench isolation, the well having sidewalls formed by the portion of the silicon oxide in the shallow trench isolation.

12. The pixel of claim 11, wherein the drain of the AB transistor is positioned outside the sidewalls of the well in the shallow trench isolation.

13. An image sensor device, comprising:
a plurality of pixels configured to generate signals based on photoelectrons accumulated by the pixels when exposed to light, wherein at least one of the pixels includes:
a silicon substrate;
a photodiode formed in the substrate;
a shallow trench isolation formed in the substrate, the shallow trench isolation being filled with silicon oxide and at least partially positioned between the photodiode and a boundary of the pixel in a horizontal dimension of the pixel; and
an anti-blooming (AB) transistor, wherein the AB transistor includes:
a gate formed by polysilicon positioned inside a portion of the silicon oxide of the shallow trench isolation; and
a drain positioned outside the portion of the silicon oxide of the shallow trench isolation, the drain being isolated from the gate by the silicon oxide.

14. The image sensor device of claim 13, further comprising:
a reset gate formed above the substrate in a vertical dimension of the pixel;
a source follow gate formed above the substrate in the vertical dimension;
a row selection gate formed above the substrate in the vertical dimension; and
a drain region formed in the substrate, the drain region being a drain of the reset gate and the source follow gate;
wherein the reset gate and the source follow gate are at least partially above the drain region in the vertical dimension.

15. The image sensor device of claim 14, wherein the drain region is positioned on a side of the shallow trench isolation horizontally between the photodiode and the boundary of the pixel, and wherein the drain region includes the drain of the AB transistor.

16. The image sensor device of claim 14, wherein the drain of the AB transistor is positioned in an additional portion of the silicon oxide of the shallow trench isolation, and wherein the drain of the AB transistor is coupled to a separate voltage source from the drain region.

17. A system, comprising:
a camera, comprising:
one or more lenses; and
an image sensor configured to receive light that has passed through the lenses to reach the image sensor, comprising:
a plurality of pixels configured to generate signals based on photoelectrons accumulated by the pixels when exposed to the light, wherein at least one of the pixels includes:
a silicon substrate;
a photodiode formed in the substrate;
a shallow trench isolation formed in the substrate, the shallow trench isolation being filled with silicon oxide and at least partially positioned between the photodiode and a boundary of the pixel in a horizontal dimension of the pixel; and
an anti-blooming (AB) transistor, wherein the AB transistor includes:
a gate formed by polysilicon positioned inside a portion of the silicon oxide of the shallow trench isolation; and
a drain positioned outside the portion of the silicon oxide of the shallow trench isolation, the drain being isolated from the gate by the silicon oxide; and
an image signal processor configured to process the signals from the image sensor to generate one or more images.

18. The system of claim 17, further comprising:
- a reset gate formed above the substrate in a vertical dimension of the pixel;
- a source follow gate formed above the substrate in the vertical dimension;
- a drain region formed in the substrate, the drain region being a drain of the reset gate and the source follow gate;
- a row selection gate formed above the substrate in the vertical dimension;
- a floating diffusion region formed in the substrate; and
- a transfer gate formed above the substrate in a vertical dimension, the photodiode being a source of the transfer gate and the floating diffusion region being a drain of the transfer gate.

19. The system of claim 18, wherein the drain of the AB transistor is in the drain region, and wherein the drain region is positioned on a side of the shallow trench isolation horizontally between the photodiode and the boundary of the pixel.

20. The system of claim 17, further comprising an AB transistor drain region formed in the shallow trench isolation, wherein the AB transistor drain region includes doped silicon surrounded by silicon oxide, the doped silicon forming the drain of the AB transistor.

* * * * *